340-870.14 SR
OR 2,548,345
April 10, 1951 R. S. BUTTS 2,548,345
TELEMETRIC SYSTEM
Filed Sept. 29, 1948
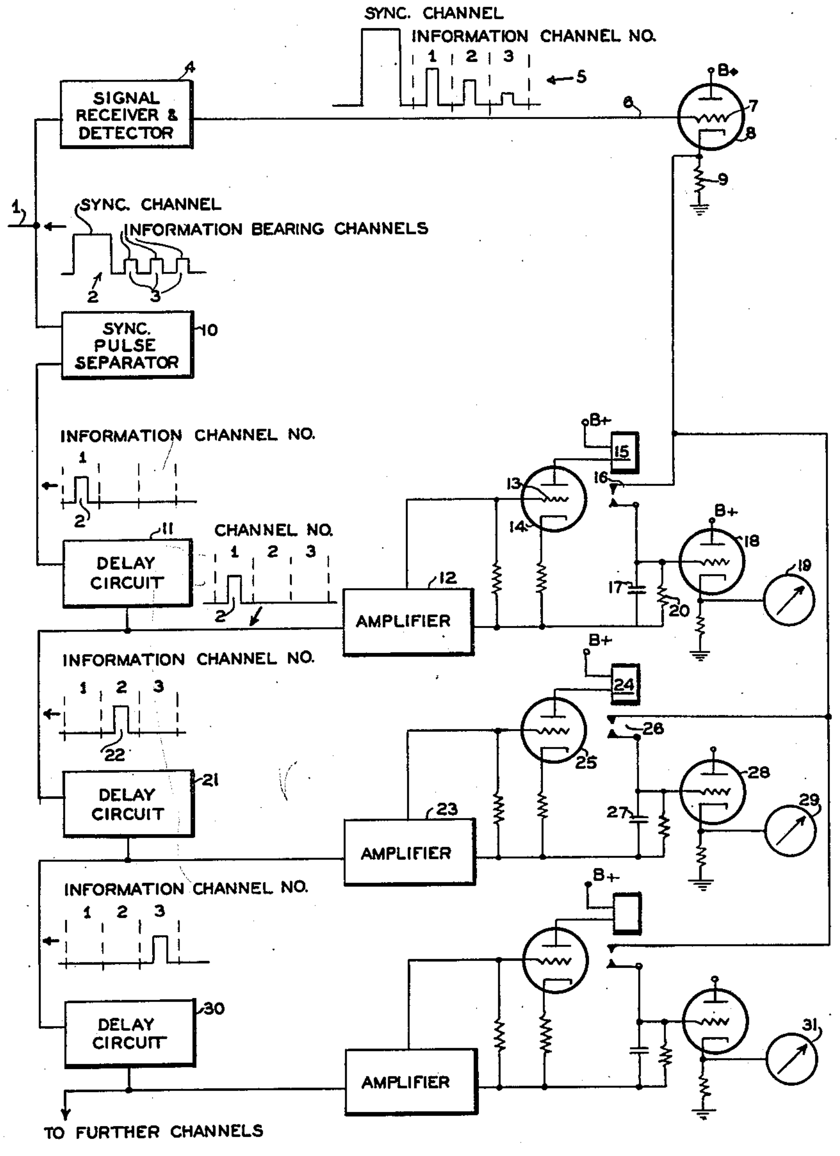
INVENTOR.
ROBERT S. BUTTS
BY Hyman Hurvitz
ATTORNEY Patented Apr. 10, 1951 2,548,345

UNITED STATES PATENT OFFICE 2,548,345

TELEMETRIC SYSTEM

Robert S. Butts, Arlington, Va., assignor to Melpar, Inc., Alexandria, Va.

Application September 29, 1948, Serial No. 51,673

4 Claims. (Cl. 177—351)

This invention relates generally to multiplex telemetric systems, and more particularly to time division multiplex systems of communication for transferring from one location to another location, in time divided channels, signals representative of the magnitude of a plurality of quantities, and for indicating visually the magnitude of the quantity represented by the signal in each of the channels.

Systems of the above character are well known broadly, but those systems with which I am familiar are not particularly adapted for indicating the value of the information bearing signals in each of the channels continuously in terms of the readings of a simple type of meter, for the reason that the signals in each of the channels are transient, the plurality of channels being rendered operative in time succession, so that any one channel is operative for only a small fraction of the total time allocated to communication. It has, accordingly, been the usual practice to record the magnitudes of the signals in the various channels continuously, so that the magnitude of the signal in any one of the channels may be readily derived from study of the finished recording.

For many purposes, however, it is extremely desirable that each of the channels be capable of being monitored separately from the other channels, and that each of the channels be provided with a continuously available indicator which indicates at all times the instantaneous value of the signal in the channel. This objective may be accomplished in one manner which is known to me by separately averaging the signals present in the outputs of the separate channels. This method has the defect, however, that the average signal is very much lower than the peak intensity of the signal as actually received, when a considerable number of channels is utilized, which reduces the overall sensitivity of the system. Furthermore, in systems of this character, channel separation is a function which is entirely independent of the function of determining the magnitude of the signals in the separate channels. In accordance with the present invention the channel separator itself is utilized as a part of a meter reading circuit for determining the value of the signals in each of the channels, and for controlling the reading of a conventional type of meter in accordance with the peak value of the signal rather than with an average value of the signal, whereby the sensitivity of the overall system is not reduced, and the system as a whole is greatly simplified over those known by me to exist in the prior art.

Briefly described, a system arranged in accordance with the present invention operates as follows:

Signals are received in a plurality of time divided channels the first of which may be assumed to constitute a synchronizing channel for the system. The synchronizing signal in the synchronizing channel is separated from the remaining information bearing signal and is delayed by a time equal to the time separation between channels. The delayed signal is then applied to actuate a relay, which, when energized, closes a first pair of normally open contacts. All the channels of the multiplex signal are commonly detected and amplified and thereafter are applied to the control grid of a common cathode coupled amplifier. Closure of the first pair of normally open contacts is caused to transfer the voltage existing across the cathode load of the cathode coupled amplifier to a condenser which is shunted with a relatively high resistance, so that any voltage applied thereto is stored thereon. The contacts remain closed only for the duration of the first information bearing channel, and, accordingly, the condenser is charged to a voltage which is substantially equal to the voltage inherent in the multiplex signal in the first of the channels only. A cathode follower type of amplifier is connected across the condenser circuit so that the voltage on the condenser serves to establish a bias for a cathode follower. Across the cathode load of the cathode follower is connected directly a voltage measuring instrument of any desired type, such as a galvanometer, cathode ray tube indicator, or the like.

At the output of the delay circuit constituted in the first channel of the system is provided a further delay circuit which provides a delay for the pulse output of the first mentioned delay circuit equal to the time between channels. Accordingly, the second delay circuit provides a pulse output timed to coincide with the second information bearing channel. The latter pulse is utilized to control a relay for closing a second pair of normally open contacts, which in turn serve to transfer to a second storage circuit voltage from the first mentioned cathode follower, on the grid of which is now impressed the signal corresponding with the second information bearing channel. Accordingly, the second storage condenser of the second information bearing channel is now charged with a voltage corresponding with the signal in the second information bearing channel. The voltage on the storage condenser in the second information bearing channel is utilized to establish a controllable bias for a cathode follower, across the cathode circuit of which is connected a voltage measuring device similar to that employed in the first channel.

The chain of circuits may be continued indefinitely, in the manner described, each of the channels being provided with a sepaarte storage condenser and a separate relay for connecting the storage condenser in circuit with the signal receiver at the proper moment to establish on the condenser a voltage corresponding with the signal in the appropriate channel. Each of the storage condensers is utilized to establish a bias for a cathode follower, which in turn actuates a meter. The storage condensers are each shunted by a resistance of relatively high value, so that the charge on the condenser remains essentially constant until the recurrence of the channel establishes a new charge according to the level of signal in the channel. If the channel level is higher the condenser charges to the new value. If lower the condenser discharges to the new level.

Since the storage condensers in each of the separate multiplex channels may be assumed to maintain a charge substantially over a relatively long period of time, the magnitudes of the signals in any of the channels not varying at a rapid rate, the reading of the meters associated with any one of the channels is relatively steady, and provides a readily visible indication of the peak value of the signal in the channel.

While the circuit closing relays associated with the separate condensers must be very rapid in operation in order to accommodate the rapid interchange of channels in a time division multiplex system of communication, completely satisfactory operation has been obtainable in a specific apparatus which I have constructed in accordance with the principles of my invention, and which I have tested successfully in practical operation.

It is, accordingly, a broad object of the present invention to provide an improved time division multiplex system of communication.

It is a further object of my invention to provide a novel commutating system for a time division multiplex system of communication.

It is a further object of the present invention to provide a system for visually indicating in simple manner and continuously the peak values of the signals in the separate channels of a time division pulse multiplex telemetric system.

More specifically stated, it is an object of the present invention to provide a time division multiplex system wherein the peak amplitude of the signals in each of the various channels is stored in a storage device while the channel is operative, and maintained in the storage device in the period while the channel is inoperative, the character or magnitude of the signals stored in the storage device being indicated continuously rather than only when the channel is operative.

The features of the present invention which I believe to be novel will be defined in the appended claims. The invention itself, however, as applied to a specific embodiment thereof, will be described in the following specification by reference to the accompanying drawings, wherein the single figure is a functional block diagram of a specific embodiment of my invention.

Referring now to the drawings, the reference numeral 1 indicates an incoming transmission line on which is impressed a series of signals of time divided multiplex type, the first of which, identified by the reference numeral 2, represents a synchronizing signal. The remaining channels are information bearing channels, the signals in which are identified by the reference numeral 3.

I have illustrated the system as containing, specifically, a minimum of three information bearing channels, it being understood, however, that in the practical embodiment of my invention which I have constructed, I have included fifteen such channels, and that the principle of the present invention may be applied to a multiplex system utilizing any desired number of channels without modifying in any respect the principles upon which the invention is based.

All the signals conveyed by the line 1 are applied to a signal receiver 4 which serves to detect and amplify the signals. The communication system may transmit signals by means of modulated electro-magnetic energy, as radiant energy, or over a transmission line, and the specific character of the signal receiver 4 is determined in accordance with the type of modulation which is employed in the system. I realize that many different types of modulation are available for use in time division multiplex systems. For example, a type of modulation may be employed wherein pulses are transmitted in the separate channels, each pulse being length modulated, or time position modulated, in accordance with the magnitude of the telemetric information to be conveyed. Alternatively, signals may be transmitted which are frequency modulated or amplitude modulated, and the modulation may take place with reference to a sub-carrier impressed on a main carrier, or on the main carrier directly. My invention, however, does not concern itself with the specific type of modulation which is employed in the multiplex system, it being assumed that the signal receiver 4 will be properly designed to abstract from the carrier received thereby the information contained therein, and that at the output of the signal receiver 4 will be provided a series of pulses which may have any width up to and including the width of a complete channel, which are of D. C. character, and which have amplitudes proportional to, or representative of, the magnitudes of the quantities which were measured at the transmitter of the system.

These signals, which are identified by the reference numeral 5 in the drawing, are applied over a line 6 to a control electrode 7 of a cathode follower type of amplifier comprising an electronic amplifying tube 8 and a cathode load resistor 9. Accordingly, across the cathode resistor 9 will be generated a voltage, the envelope of which will correspond precisely with the signal 5. Signals incoming on the line 1, and comprising the synchronizing pulse 2, and the information bearing signals 3, are applied to a sync pulse separator 10, which passes only pulses having greater than a predetermined width. Since the sync pulse 2 has a considerably greater width than the bearing signals 3, the successive sync pulses 2 pass to the output of the sync pulse separator channel 10, the remaining signals 3 being suppressed. The sync pulses 2 are now applied to a delay circuit 11 which may comprise a "flip-flop" circuit or multi-vibrator, and which introduces a delay equal to the time between channels in the system. Accordingly, each sync pulse 2 arrives at the output of the delay circuit 11 at a time precisely correspondingly with or superposed over the information bearing channel 1, and is applied to an amplifier circuit 12 where it is amplified to a suitable extent and thence applied in a positive sense to the control electrode 13 of an amplifier tube 14 comprising in its plate circuit a relay coil 15, which is normally deenergized, and which is utilized to close a pair of normally open contacts 16 in response to energization of the relay 15.

Accordingly, the contact 16 will be closed substantially for the duration of the information bearing channel #1. The movable contact of the contacts 16 is connected directly with one terminal of a storage condenser 17, the remaining terminal of which is grounded, and the stationary contact of the contacts 16 is connected to the positive end of the resistor 9 connected in the cathode circuit of the cathode follower tube 8. At the time that the relay 15 is energized, i. e. for the duration of information bearing channel #1, the signal contained in information bearing channel #1 is being applied from the signal receiver 4 via the line 6 to the electrode 7 of the electronic amplifier tube 8, and, accordingly, the voltage across the load resistor 9 is then proportional to the amplitude of the signal in channel #1. This voltage is now impressed, via the now closed contacts 16, on the storage condenser 17, and promptly charges the latter to the same voltage as exists across the cathode resistor 9. At the termination of channel #1 the signal applied to the control electrode 13 terminates, the relay 15 is de-energized, and the contacts 16 open, leaving the condenser 17 charged substantially to the voltage existing across the load resistor 9 of the cathode follower amplifier 8.

Connected across the storage condenser 17 is the input circuit of an amplifier tube 18, which may be connected as an amplifier of the cathode follower type, and across the cathode circuit of which may be connected a visual indicator 19, which may be specifically a galvanometer type of indicator of relatively inexpensive type, if desired. Connected in shunt with the storage condenser 17 is provided a discharging resistor 20 having a relatively high value of resistance. Accordingly, the time constant of the circuit comprising the storage condenser 17 and the resistance 20 is sufficiently high so that a negligibly small proportion of the charge existing on the condenser 17 is permitted to leak from the latter between successive operations of channel 1. Since the quantity being measured may be expected to remain relatively constant over a period of many channel occurrences the voltage across the condenser 17 and consequently the voltage applied to the cathode coupled amplifier 18, remains substantially constant, the reading of the meter 19 is substantially free of fluctuation, and the reading of the meter 19 corresponds with the peak value of amplitude of the signal in channel #1.

The output pulse provided by the delay circuit 11 is applied not only to the input of the amplifier 12, but also to the input circuit of a further delay circuit 21, which may be precisely identical with the delay circuit 11, and which, accordingly, introduces a delay equal to the time between successive channels of the communication system. Accordingly, there is provided at the output of the delay circuit 21 a pulse 22 corresponding in time with information bearing channel #2 of the system, this pulse being amplified in the amplifier 23 the output of which serves to energize the relay 24 connected in the plate circuit of the amplifier tube 25. Accordingly, the relay 24 is rendered energized as during the time allocated to channel #2, and when energized, closes the normally open contacts 26, the stationary one of which is connected to the positive terminal of the cathode resistor 9 of the amplifier 8. Accordingly, the voltage existing across the resistance 9 during channel #2 is impressed on the storage condenser 27, which serves to establish a bias for the amplifier 28, and hence a reading of the meter 29. Since charges are applied to the storage condenser 27 only for the duration of channel #2, the reading of the meter 29 corresponds with the amplitudes of the signals in the channel #2.

The output of the delay circuit 21 is applied not only to the amplifier 23, but also the input circuit of a further delay circuit 30 which is similar in construction and design to the delay circuits 11 and 21, which serves to introduce a sufficient delay so that the pulse output of the delay circuit 21 is available at the output of the delay circuit 30 at a time corresponding with channel #3. The same sequence of events which has previously been described in connection with the operation of channels numbers 1 and 2 now takes place in relation to channel # 3, so that eventually the meter 31 reads the peak value of the signals in channel #3.

Obviously the chain of events immediately above described may be caused to continue indefinitely, for any desired number of channels. As has been recited hereinbefore, in a practical embodiment of the present invention, I have utilized a total of 15 channels successfully.

While I have illustrated and described one specific application of the present invention, it will be understood that variations of the details of the circuit, and of the arrangement thereof, may be resorted to without departing from the true spirit and scope of the invention.

What I claim and desire to secure by Letters Patent of the United States is:

1. A channel separating and signal detecting and indicating system for successive groups of time divided multiplex signals, comprising, a single detector device for providing a detected output in response to said time divided multiplex signals across a load resistance for said device, a first relay, means providing a synchronizing signal occurring antecedent to each group of time divided multiplex signals, first means responsive to said synchronizing signal for energizing said first relay only during occurrence of a first multiplex signal, a second relay, second means responsive to said first means for energizing said second relay only during occurrence of a second multiplex signal, a third relay, third means responsive to said second means for energizing said third relay only during occurrence of a third multiplex signal, a first pair of normally open contacts closable in response to energization of said first relay, a second pair of normally open contacts closable in response to energization of said second relay, a third pair of normally open contacts closable in response to energization of said third relay, a first storage condenser, means responsive to closure of said first contacts for connecting said first storage condenser across said load resistance, a second storage condenser, means responsive to closure of said second contacts for connecting said second storage condenser across said load resistance, a third storage condenser, means responsive to closure of said third contacts for connecting said third storage condenser across said load resistance, a separate cathode follower permanently connected across each of said storage condensers, and a separate meter actuated in response to each of said cathode followers.

2. A channel separating and signal detecting and indicating system for successive groups of time divided multiplex signals comprising, a single detector for providing a detected output in response to said time divided multiplex signals, a single cathode follower amplifier for said detected output, said cathode follower having a cathode resistor load, a first relay, a circuit providing a synchronizing pulse occurring antecedent to each group of time divided multiplex signals, first means responsive to said synchronizing signal for generating a control pulse during occurrence of a first multiplex signal, means responsive to said control pulse for energizing said first relay for the duration of said control pulse only, a second relay, second means responsive to said first control pulse for generating a second control pulse during occurrence of a second multiplex signal, means responsive to said second control pulse for energizing said second relay during said second control pulse only, a third relay, third means responsive to said second control pulse for generating a third control pulse only during occurrence of a third multiplex signal, means responsive to said third control pulse for energizing said third relay during said third control pulse only, a first pair of normally open contacts closable in response to energization of said first relay, a second pair of normally open contacts closable in response to energization of said second relay, a third pair of normally open contacts closable in response to energization of said third relay, a first storage condenser, means responsive to closure of said first contacts for connecting said first condenser to said cathode resistor load, a second storage condenser, means responsive to closure of said second contacts for connecting said second storage condenser to said cathode resistor load, a third storage condenser, means responsive to closure of said third contacts for connecting said third storage condenser to said cathode resistor load, a first cathode follower having an input circuit permanently connected across said first storage condenser, said first cathode follower having a first output circuit, a first meter permanently connected in said first output circuit, a second cathode follower having an input circuit permanently connected across said second storage condenser, said second cathode follower having a second output circuit, and a second meter permanently connected in said second output circuit, a third cathode follower having an input circuit permanently connected across said third condenser, said third cathode follower having a third output circuit, and a third meter permanently connected in said third output circuit, a separate cathode follower permanently connected across each of said storage condensers, and a separate meter actuated in response to each of said cathode followers.

3. A channel separating and signal detecting and indicating system for successive groups of time divided multiplex signals comprising, a single detector for providing detected output in response to said time divided multiplex signals, a single cathode follower having an input circuit connected to translate said detected output and having a cathode resistor load, means providing a synchronizing signal occurring antecedent to each group of time divided multiplex signals, first circuit closure means, first means responsive to said synchronizing signal for closing said circuit closure means during occurrence of a first multiplex signal, second circuit closure means, second means responsive to said first means for closing said second circuit closure means during occurrence of a second multiplex signal, third circuit closure means, third means responsive to said second means for closing said third circuit closing means during occurrence of a third multiplex signal, a first storage condenser, means responsive to closure of said first circuit closure means for connecting said first storage condenser to said cathode resistor load, a second storage condenser, means responsive to closure of said second circuit closure means for connecting said second storage condenser to said cathode resistor load, a third storage condenser, means responsive to closure of said third circuit closure means for connecting said third storage condenser to said cathode resistor load, a separate cathode follower permanently connected across each of said storage condensers, and a separate meter actuated in response to each of said cathode followers.

4. A channel separating a signal detecting and indicating system for successive groups of time divided multiplex signals comprising, means comprising a detector and having a single output resistance for providing a detected output across said single output resistance in response to said time divided multiplex signals, a first storage condenser, a second storage condenser, a third storage condenser, means providing a synchronizing signal occurring antecedent to each group of time divided multiplex signals, means responsive to each synchronizing signal for generating a control pulse during occurrence of a first multiplex signal, means responsive to said first control pulse for generating a second control pulse during occurrence of a second multiplex signal, means responsive to said second control pulse for generating a third control pulse during occurrence of a third multiplex signal, means comprising a first relay and two normally open first contacts and responsive to said first control pulse to close said first contacts for connecting said first storage condenser across said single output resistance, means comprising a second relay and two normally open second contacts and responsive to said second control pulse to close said second contacts for connecting said second storage condenser across said single output resistance, means comprising a third relay and two normally open third contacts and responsive to said third control pulse to close said third contacts for connecting said third storage condenser across said single output resistance, a separate cathode follower permanently connected across each of said storage condensers, and a separate meter actuated in response to each of said cathode followers.

ROBERT S. BUTTS.

REFERENCES CITED

The following references are of record in the file of this patent:

UNITED STATES PATENTS

| Number | Name | Date |
|---|---|---|
| 1,614,222 | White | Jan. 11, 1927 |
| 1,849,827 | FitzGerald | Mar. 15, 1932 |
| 2,012,837 | Tear | Aug. 27, 1935 |
| 2,114,578 | Strauss | Apr. 19, 1938 |
| 2,146,862 | Shumard | Feb. 14, 1939 |
| 2,313,666 | Peterson | Mar. 9, 1943 |
| 2,444,950 | Nichols | July 13, 1948 |
| 2,468,703 | Hammel | Apr. 26, 1949 |

FOREIGN PATENTS

| Number | Country | Date |
|---|---|---|
| 720,583 | France | Feb. 22, 1932 |